US012768679B2

(12) United States Patent
Iwano

(10) Patent No.: US 12,768,679 B2
(45) Date of Patent: Oct. 20, 2026

(54) CORRECTION SYSTEM, CORRECTION APPARATUS, AND CORRECTION METHOD

(71) Applicant: NEC Corporation, Tokyo (JP)

(72) Inventor: Tadayuki Iwano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 413 days.

(21) Appl. No.: 18/280,609

(22) PCT Filed: Mar. 10, 2021

(86) PCT No.: PCT/JP2021/009497
§ 371 (c)(1),
(2) Date: Sep. 6, 2023

(87) PCT Pub. No.: WO2022/190248
PCT Pub. Date: Sep. 15, 2022

(65) Prior Publication Data
US 2024/0151559 A1 May 9, 2024

(51) Int. Cl.
*G01D 5/353* (2006.01)
*G01H 9/00* (2006.01)
*G01K 11/32* (2021.01)

(52) U.S. Cl.
CPC ........... *G01D 5/35358* (2013.01); *G01H 9/00* (2013.01); *G01K 11/32* (2013.01)

(58) Field of Classification Search
CPC ....... G01D 5/35358; G01H 9/00; G01K 11/32
See application file for complete search history.

(56) References Cited

U.S. PATENT DOCUMENTS 9,297,694 B2 * 3/2016 Nomura .................... G01J 1/18
11,517,289 B2 * 12/2022 He ....................... A61B 8/5207
2010/0054298 A1 * 3/2010 Sasaoka ................. G01K 11/32 374/E11.015
2011/0310925 A1 * 12/2011 Agawa ................. G01K 15/005 374/161
2017/0356793 A1 * 12/2017 Nishiguchi ............ G01H 9/006

FOREIGN PATENT DOCUMENTS

CN 109682321 A 4/2019
EP 3896409 B1 * 3/2023 ......... G01D 3/35358
JP 2008-051643 A 3/2008
JP 2012-027001 A 2/2012
WO 2016/117044 A1 7/2016

OTHER PUBLICATIONS

International Search Report for PCT Application No. PCT/JP2021/009497, mailed on May 11, 2021.

* cited by examiner

*Primary Examiner* — Dominic J Bologna
(74) *Attorney, Agent, or Firm* — Sughrue Mion, PLLC

(57) ABSTRACT

A correction system (1) according to the present disclosure includes: an optical fiber sensing apparatus (101) configured to receive an optical signal from an optical fiber (200), and acquire sensed data from the optical signal; an analysis apparatus (102) configured to analyze an analysis target based on the sensed data; an absolute value acquisition apparatus (103) configured to acquire an absolute value of the analysis target; and a correction apparatus (104) configured to correct an analysis result for the analysis target from the analysis apparatus (102), based on the absolute value of the analysis target.

12 Claims, 9 Drawing Sheets

| DISTANCE FROM OPTICAL FIBER SENSING APPARATUS | INSTALLATION POSITION OF THERMOMETER |
|---|---|
| * * [m] | * * (THERMOMETER 400-1) |
| * * [m] | * * (THERMOMETER 400-2) |
| : | : |

| DATE/TIME | INSTALLATION POSITION OF THERMOMETER | TEMPERATURE |
|---|---|---|
| YY/MM/DD *:** | ** (THERMOMETER 400-1) | **[°C] |
| YY/MM/DD *:** | ** (THERMOMETER 400-2) | **[°C] |
| : | : | : |

| DISTANCE FROM OPTICAL FIBER SENSING APPARATUS | AMOUNT OF CORRECTION |
|---|---|
| ＊＊ (THERMOMETER 400-1) | ＊＊[°C] |
| ＊＊ (THERMOMETER 400-2) | ＊＊[°C] |
| : | : |

| LOCATION | TEMPERATURE BEFORE CORRECTION | TEMPERATURE AFTER CORRECTION |
|---|---|---|
| LOCATION A | ＊＊[°C] | ＊＊[°C] |
| LOCATION B | ＊＊[°C] | ＊＊[°C] |
| : | : | : |

CORRECTION SYSTEM, CORRECTION APPARATUS, AND CORRECTION METHOD

This application is a National Stage Entry of PCT/JP2021/009497 filed on Mar. 10, 2021, the contents of all of which are incorporated herein by reference, in their entirety.

TECHNICAL FIELD

The present disclosure relates to a correction system, a correction apparatus, and a correction method.

BACKGROUND ART

Optical fiber sensing is a technique of causing pulsed light to enter an optical fiber, receiving backscattered light generated due to transmission of the pulsed light through the optical fiber, and analyzing an analysis target around the optical fiber based on a change in a wavelength of the backscattered light (for example, see Patent Literature 1). As the analysis target, a temperature, an amount of vibration, a sound volume, or the like may be cited, for example.

CITATION LIST

Patent Literature

[Patent Literature 1]
International Patent Publication No. WO 2016/117044

SUMMARY OF INVENTION

Technical Problem

An analysis result for an analysis target such as a temperature, noise, or the like that is analyzed by optical fiber sensing does not take an absolute value but takes a relative value.

For example, an analysis result for a temperature indicates a temperature at each position on an optical fiber, but the temperature does not take an absolute value.

Accordingly, when displaying, to a user, the analysis result for a temperature based on optical fiber sensing, the user can only grasp a relative value indicating whether the temperature at a specific position on the optical fiber is higher or lower compared to another position on the optical fiber and by how many degrees.

Accordingly, there has recently been a demand for a technique that allows an analysis result of optical fiber sensing to be corrected into an absolute value so that a user can visualize the analysis value as an absolute value.

Accordingly, an object of the present disclosure is to solve the problem as described above, and to provide a correction system, a correction apparatus, and a correction method that are capable of correcting an analysis result of optical fiber sensing into an absolute value.

Solution to Problem

A correction system apparatus according to an aspect includes:

- an optical fiber sensing apparatus configured to receive an optical signal from an optical fiber, and acquire sensed data from the optical signal;
- an analysis apparatus configured to analyze an analysis target based on the sensed data;
- an absolute value acquisition apparatus configured to acquire an absolute value of the analysis target; and
- a correction apparatus configured to correct an analysis result for the analysis target from the analysis apparatus, based on the absolute value of the analysis target.

A correction apparatus according to an aspect includes:

- an optical fiber sensing unit configured to receive an optical signal from an optical fiber, and acquire sensed data from the optical signal;
- an analysis unit configured to analyze an analysis target based on the sensed data;
- an absolute value acquisition unit configured to acquire an absolute value of the analysis target; and
- a correction unit configured to correct an analysis result for the analysis target from the analysis unit, based on the absolute value of the analysis target.

A correction method according to an aspect is

- a correction method performed by a correction apparatus, the method including:
- a step of receiving an optical signal from an optical fiber, and acquiring sensed data from the optical signal;
- an analysis step of analyzing an analysis target based on the sensed data;
- an absolute value acquisition step of acquiring an absolute value of the analysis target; and
- a correction step of correcting an analysis result for the analysis target by the analysis step, based on the absolute value of the analysis target.

Advantageous Effects of Invention

According to the aspects described above, an advantageous effect that it is possible to provide a correction system, a correction apparatus, and a correction method that are capable of correcting an analysis result of optical fiber sensing into an absolute value may be obtained.

EXAMPLE EMBODIMENTS

Hereinafter, example embodiments of the present disclosure will be described with reference to the drawings. In the following description and drawings, omission and simplification are made as appropriate for the sake of clarity of description. Furthermore, in the following drawings, same elements are denoted by a same reference sign, and a redundant description is not repeated as necessary. Furthermore, in the following, an analysis target is described to be a temperature, but the analysis target is not limited to be a temperature, and may instead be an amount of vibration, a sound volume, or the like.

First Example Embodiment

Figures 1, 2:
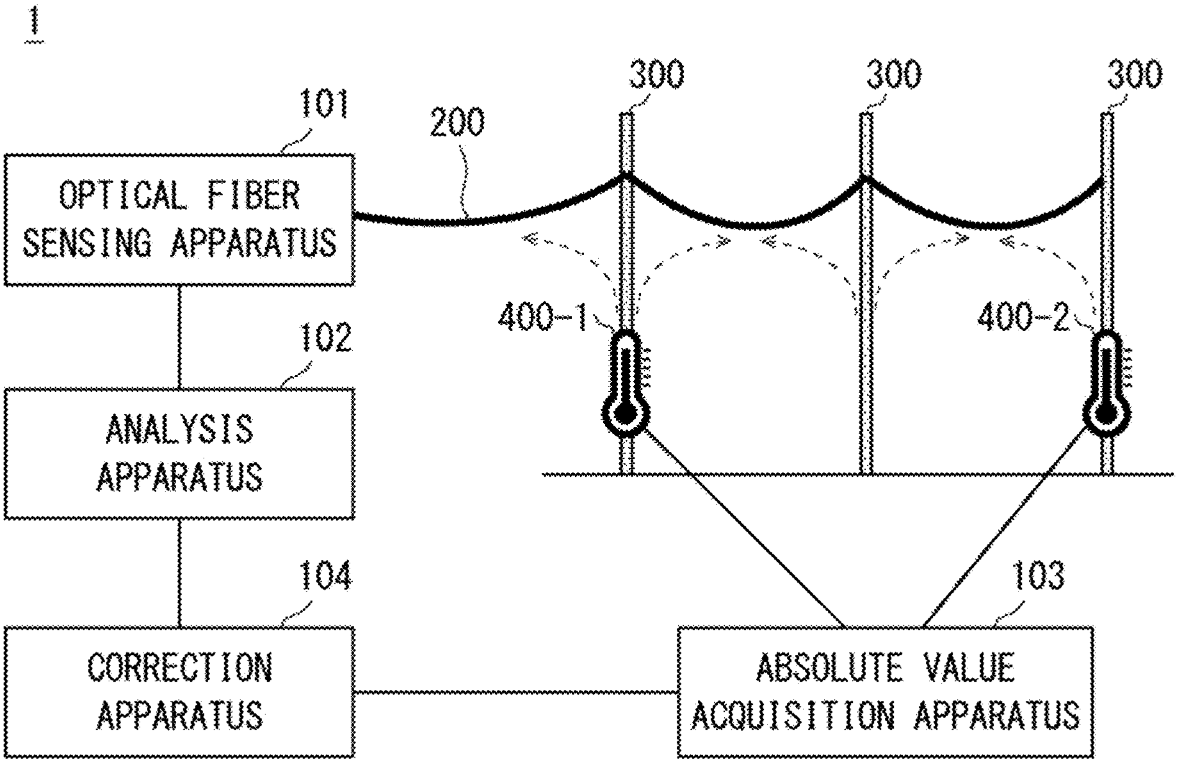
FIG. 1 is a block diagram showing an example configuration of a correction system according to a first example embodiment.
FIG. 2 is a diagram showing an example of a table held in an analysis apparatus according to the first example embodiment.

First, a configuration of a correction system 1 according to a first example embodiment will be described with reference to FIG. 1. As shown in FIG. 1, the correction system 1 according to the present example embodiment includes an optical fiber sensing apparatus 101, an analysis apparatus 102, an absolute value acquisition apparatus 103, and a correction apparatus 104.

One end of an optical fiber 200 is connected to the optical fiber sensing apparatus 101.

The optical fiber 200 is suspended in the air between utility poles 300. However, a method of installing the optical fiber 200 is not limited thereto. The optical fiber 200 may be installed on another structure, or may be buried in the ground.

Furthermore, two thermometers 400-1, 400-2 are installed on freely selected utility poles 300. However, the number and installation method of the thermometers 400-1, 400-2 are not limited thereto. The thermometers 400-1, 400-2 may be installed in any way as long as the thermometers 400-1, 400-2 are installed in a manner capable of measuring a temperature around the optical fiber 200.

The optical fiber sensing apparatus 101 causes pulsed light to enter the optical fiber 200. Furthermore, the optical fiber sensing apparatus 101 receives, from the optical fiber 200, in the form of an optical signal, backscattered light generated due to transmission of the pulsed light through the optical fiber 200.

Here, when a temperature change occurs around the optical fiber 200, the change in the temperature is transmitted to the optical fiber 200, and a property (such as a wavelength) of the optical signal transmitted through the optical fiber 200 is changed. The optical fiber 200 may thus detect the temperature around the optical fiber 200, and the optical signal received from the optical fiber 200 includes temperature information indicating the temperature detected by the optical fiber 200.

Furthermore, the optical fiber sensing apparatus 101 is able to identify a position on the optical fiber 200 where the optical signal occurred (a distance from the optical fiber sensing apparatus 101 to the optical fiber 200), based on a time difference between a time of the pulsed light entering the optical fiber 200 and a time of reception of the optical signal from the optical fiber 200. Accordingly, the optical fiber sensing apparatus 101 is able to identify the temperature at the position where the optical signal occurred, based on the temperature information included in the optical signal in question.

Accordingly, the optical fiber sensing apparatus 101 is able to acquire sensed data indicating a temperature at each position on the optical fiber 200 (each distance from the optical fiber sensing apparatus 101 to the optical fiber 200) at a given time, based on the optical signal received from the optical fiber 200. The temperature indicated by the sensed data here does not take an absolute value but takes a relative value.

The analysis apparatus 102 analyzes the temperature at each position on the optical fiber 200 (each distance from the optical fiber sensing apparatus 101 to the optical fiber 200) based on the sensed data acquired by the optical fiber sensing apparatus 101. The temperature that is analyzed by the analysis apparatus 102 takes a relative value.

As shown in FIG. 2, the analysis apparatus 102 holds a table associating a distance from the optical fiber sensing apparatus 101 to the optical fiber 200, and an installation position where the thermometer 400-1, 400-2 is installed. The analysis apparatus 102 thus analyzes at least the temperature at the installation position of the thermometer 400-1, 400-2.

Furthermore, when the temperature analysis has been made based on the sensed data, the analysis apparatus 102 acquires, from the sensed data, date/time information indicating date/time of acquisition of the sensed data, and position information indicating the position on the optical fiber 200 (the distance from the optical fiber sensing apparatus 101 to the optical fiber 200) where the temperature occurred.

Figures 3, 4:
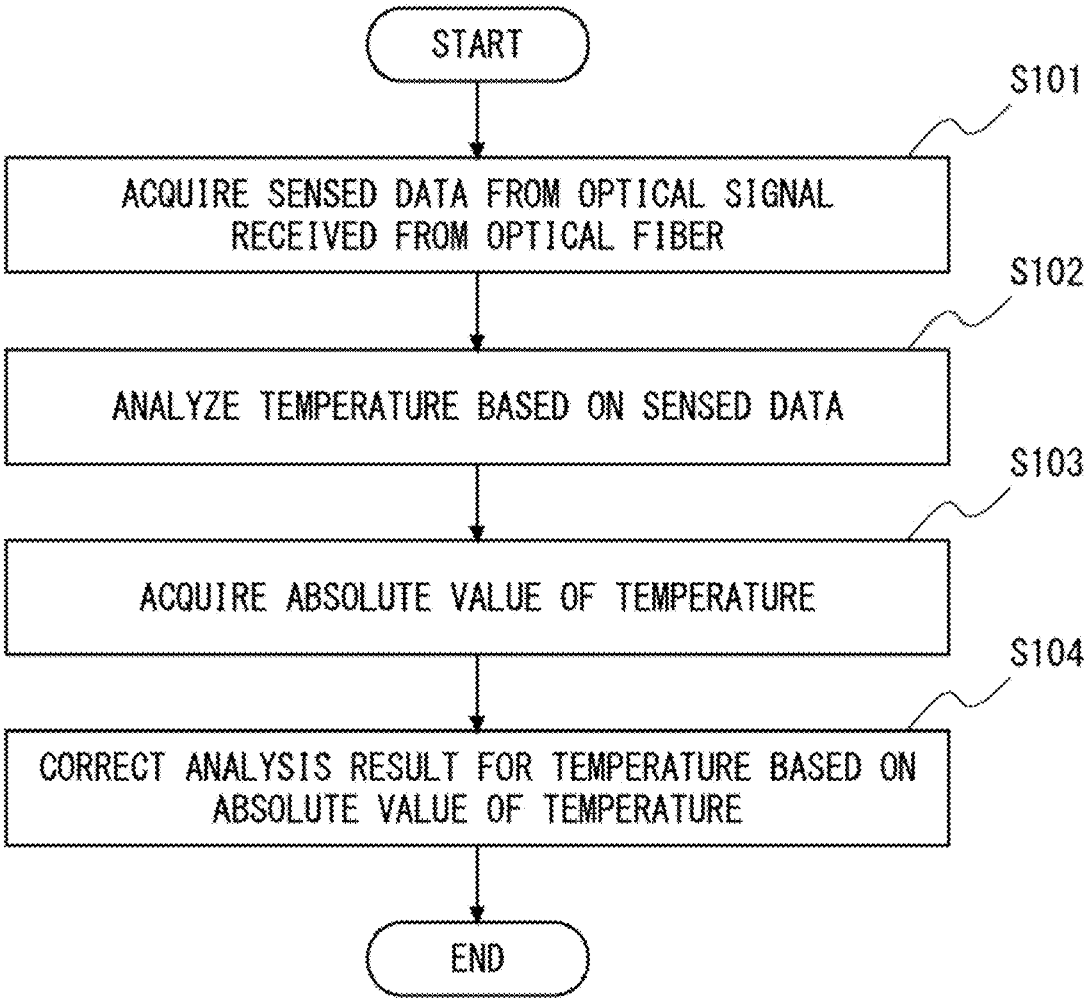
FIG. 3 is a diagram showing an example of temperature information that is acquired by an absolute value acquisition apparatus according to the first example embodiment.
FIG. 4 is a flowchart showing an example of a flow of operation of the correction system according to the first example embodiment.

The absolute value acquisition apparatus 103 acquires temperature information indicating a temperature that is measured by the thermometer 400-1, 400-2. The temperature that is measured by the thermometer 400-1, 400-2 takes an absolute value. Moreover, as shown in FIG. 3, when acquiring the temperature information, the absolute value acquisition apparatus 103 also acquires date/time information indicating date/time when the temperature was measured, and position information indicating the installation position of the thermometer 400-1, 400-2.

As described above, the analysis result for a temperature analyzed by the analysis apparatus 102 takes a relative value. In contrast, the temperature measured by the thermometer 400-1, 400-2 takes an absolute value.

Accordingly, the correction apparatus 104 corrects the analysis result for the temperature analyzed by the analysis apparatus 102, based on the absolute value of the temperature acquired by the absolute value acquisition apparatus 103.

For example, the correction apparatus 104 acquires the absolute value of the temperature of the thermometer 400-1 from the absolute value acquisition apparatus 103, and acquires the analysis result for a temperature from the same date/time and at the installation position of the thermometer 400-1 from the analysis apparatus 102. Then, the correction apparatus 104 corrects the analysis result for the temperature at the installation position of the thermometer 400-1 acquired from the analysis apparatus 102, based on the absolute value of the temperature of the thermometer 400-1 acquired from the absolute value acquisition apparatus 103.

Additionally, also with respect to the analysis result for the temperature at the installation position of the thermometer 400-2, the correction apparatus 104 may perform correction based on an absolute value of a temperature of the thermometer 400-2 in the same manner.

Next, an example of a flow of operation of the correction system 1 according to the first example embodiment will be described with reference to FIG. 4.

As shown in FIG. 4, the optical fiber sensing apparatus 101 receives an optical signal from the optical fiber 200, and acquires sensed data from the optical signal that is received (step S101).

Next, the analysis apparatus 102 at least analyzes the temperature at the installation position of the thermometer 400-1, 400-2 based on the sensed data acquired by the optical fiber sensing apparatus 101 (step S102).

Then, the absolute value acquisition apparatus 103 acquires the absolute value of the temperature measured by the thermometer 400-1, 400-2 (step S103).

Then, the correction apparatus 104 corrects the analysis result for the temperature at the installation position of the thermometer 400-1 based on the absolute value of the temperature of the thermometer 400-1, and corrects the analysis result for the temperature at the installation position of the thermometer 400-2 based on the absolute value of the temperature of the thermometer 400-2 (step S104).

Additionally, in FIG. 4, the operation in step S103 is performed after the operation in step S102, but the order of operation in steps S102, S103 is not limited to such an order. For example, the operation in step S102 may be performed after the operation in step S103, or the operation in steps S102, S103 may be performed in parallel.

As described above, according to the first example embodiment, the optical fiber sensing apparatus 101 acquires the sensed data from the optical signal that is received from the optical fiber 200. The analysis apparatus 102 analyzes the temperature based on the sensed data. The absolute value acquisition apparatus 103 acquires the absolute value of the temperature. The correction apparatus 104 corrects the analysis result for the temperature from the analysis apparatus 102, based on the absolute value of the temperature. The relative value that is the analysis result for the temperature based on optical fiber sensing can thus be corrected into an absolute value.

Second Example Embodiment

Figure 5:
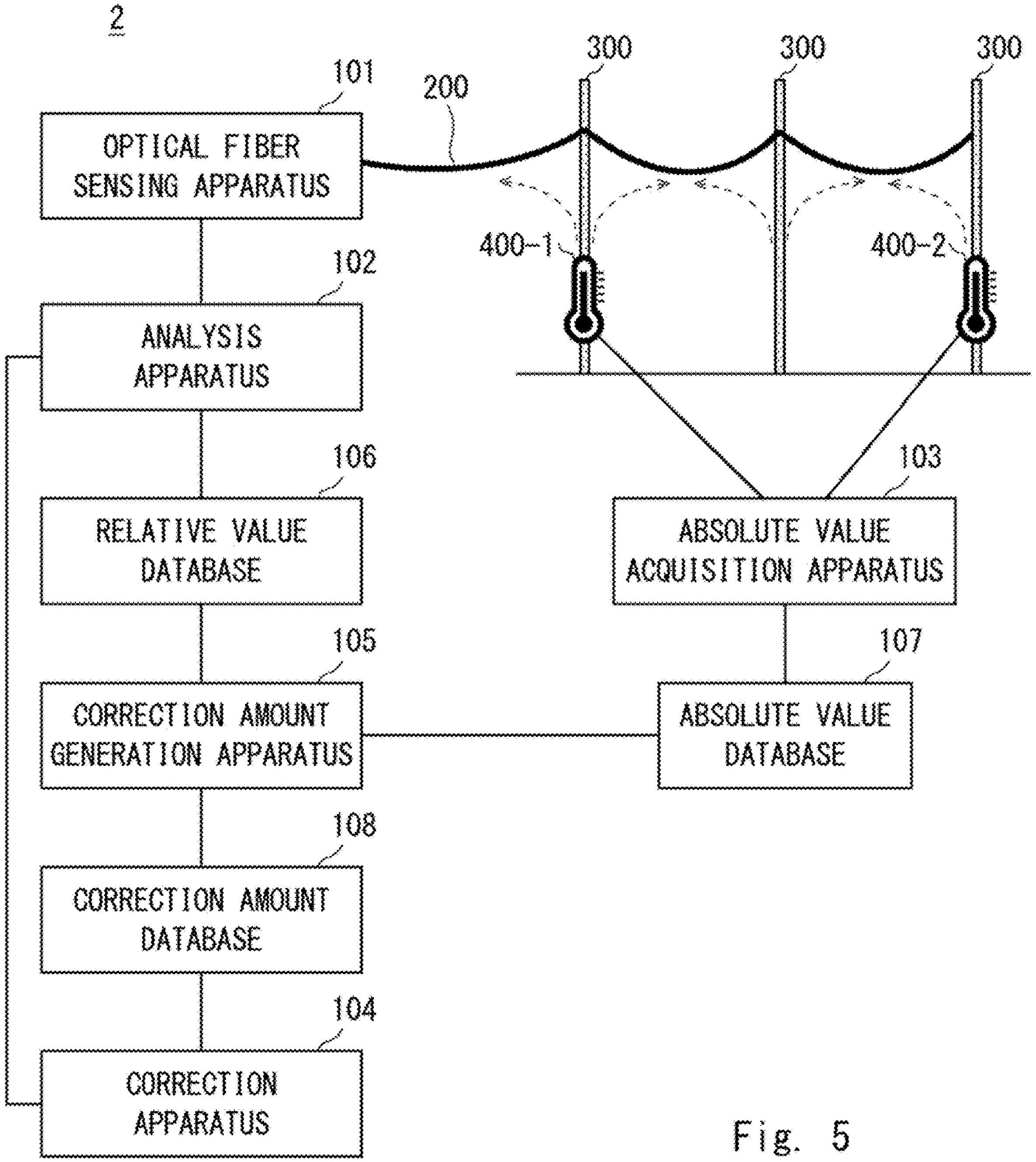
FIG. 5 is a diagram showing an example configuration of a correction system according to a second example embodiment.

First, a configuration of a correction system 2 according to a second example embodiment will be described with reference to FIG. 5. As shown in FIG. 5, the correction system 2 according to the second example embodiment is different from the correction system 1 according to the first example embodiment described above in that a correction amount generation apparatus 105, a relative value database (a first database) 106, an absolute value database (a second database) 107, and a correction amount database (a third database) 108 are added.

The correction amount generation apparatus 105 generates an amount of correction by which the analysis result for the temperature at the installation position of each of the thermometers 400-1, 400-2 is corrected, based on the absolute value of the temperature of the thermometer 400-1, 400-2 acquired by the absolute value acquisition apparatus 103 and the analysis result for the temperature at the installation position of the thermometer 400-1, 400-2 analyzed by the analysis apparatus 102.

In the following, a method of generating the amount of correction by the correction amount generation apparatus 105 will be described in detail.

When acquiring the temperature information indicating the absolute value of the temperature of the thermometer 400-1, 400-2, the absolute value acquisition apparatus 103 also acquires, as second related information, date/time information indicating date/time of measurement of the temperature and position information indicating the installation position of the thermometer 400-1, 400-2.

Furthermore, when analyzing the temperature at the installation position of the thermometer 400-1, 400-2, the analysis apparatus 102 also acquires, as first related information, from the sensed data, date/time information indicating date/time of acquisition of the sensed data and position information indicating the installation position of the thermometer 400-1, 400-2.

Accordingly, by using the first related information and the second related information mentioned above, the correction amount generation apparatus 105 pairs (associates) the absolute value of the temperature and the analysis result for the temperature with substantially matching date/time information and position information.

That is, the correction amount generation apparatus 105 pairs the absolute value of the temperature of the thermometer 400-1 with the analysis result for the temperature at the installation position of the thermometer 400-1 for the same date/time. Furthermore, the correction amount generation apparatus 105 pairs the absolute value of the temperature of the thermometer 400-2 with the analysis result for the temperature at the installation position of the thermometer 400-2 for the same date/time.

Figures 6, 7:
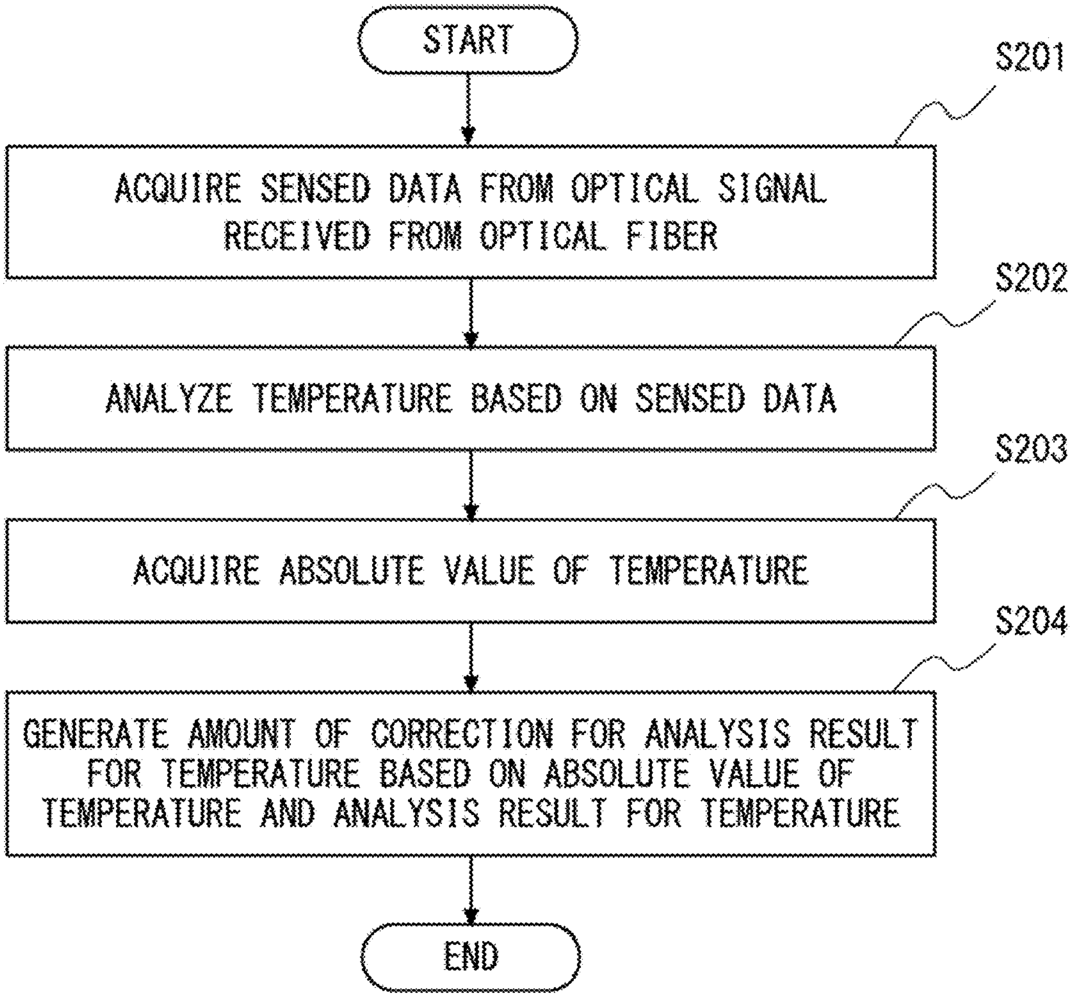
FIG. 6 is a diagram showing an example of an amount of correction generated by a correction amount generation apparatus according to the second example embodiment.
FIG. 7 is a flowchart showing an example of a flow of operation in generating an amount of correction for an analysis result in the correction system according to the second example embodiment.

Then, the correction amount generation apparatus 105 generates an amount of correction for the analysis result for the temperature at the installation position of the thermometer 400-1 based on the absolute value of the temperature of the thermometer 400-1 and the analysis result for the temperature at the installation position of the thermometer 400-1 that are paired with each other. Furthermore, the correction amount generation apparatus 105 generates an amount of correction for the analysis result for the temperature at the installation position of the thermometer 400-2 based on the absolute value of the temperature of the thermometer 400-2 and the analysis result for the temperature at the installation position of the thermometer 400-2 that are paired with each other. As shown in FIG. 6, the amount of correction for the installation position of each of the thermometers 400-1, 400-2 (the distance from the optical fiber sensing apparatus 101 to the optical fiber 200) is thus generated.

The relative value database 106 is a database for storing the analysis result for the temperature at each position on the optical fiber 200 (each distance from the optical fiber sensing apparatus 101 to the optical fiber 200) analyzed by the analysis apparatus 102. Additionally, the relative value database 106 at least stores the temperature at the installation position of each of the thermometers 400-1, 400-2. For example, the relative value database 106 stores the temperature information indicating the analysis result for the temperature, in association with the date/time information and the position information mentioned above.

The absolute value database 107 is a database for storing the absolute value of the temperature of each of the thermometers 400-1, 400-2 acquired by the absolute value acquisition apparatus 103. For example, the absolute value database 107 stores the temperature information indicating the absolute value of the temperature, in association with the date/time information and the position information mentioned above.

The correction amount database 108 is a database for storing the amount of correction for the installation position of each of the thermometers 400-1, 400-2 (the distance from the optical fiber sensing apparatus 101 to the optical fiber 200) generated by the correction amount generation apparatus 105.

After the amount of correction is stored in the correction amount database 108, the correction apparatus 104 corrects the analysis result for the temperature at the installation position of the thermometer 400-1 based on the amount of correction for the installation position of the thermometer 400-1, and corrects the analysis result for the temperature at the installation position of the thermometer 400-2 based on the amount of correction for the installation position of the thermometer 400-2.

Next, an example of a flow of operation of the correction system 2 according to the second example embodiment will be described.

First, an example of a flow of operation in generating the amount of correction for an analysis result in the correction system 2 according to the second example embodiment will be described with reference to FIG. 7.

As shown in FIG. 7, the optical fiber sensing apparatus 101 receives an optical signal from the optical fiber 200, and acquires sensed data from the optical signal that is received (step S201).

Next, the analysis apparatus 102 at least analyzes the temperature at the installation position of the thermometer 400-1, 400-2 based on the sensed data acquired by the optical fiber sensing apparatus 101 (step S202).

Then, the absolute value acquisition apparatus 103 acquires the absolute value of the temperature measured by the thermometer 400-1, 400-2 (step S203).

Then, the correction amount generation apparatus 105 generates the amount of correction for the analysis result for the temperature at the installation position of each of the thermometers 400-1, 400-2, based on the absolute value of the temperature of the thermometer 400-1, 400-2 and the analysis result for the temperature at the installation position of the thermometer 400-1, 400-2 (step S204).

More specifically, the correction amount generation apparatus 105 pairs the absolute value of the temperature of the thermometer 400-1 with the analysis result for the temperature at the installation position of the thermometer 400-1 for the same date/time. Then, the correction amount generation apparatus 105 generates the amount of correction for the analysis result for the temperature at the installation position of the thermometer 400-1 based on the absolute value of the temperature and the analysis result for the temperature that are paired with each other. Furthermore, the correction amount generation apparatus 105 pairs the absolute value of the temperature of the thermometer 400-2 with the analysis result for the temperature at the installation position of the thermometer 400-2 for the same date/time. Then, the correction amount generation apparatus 105 generates the amount of correction for the analysis result for the temperature at the installation position of the thermometer 400-2 based on the absolute value of the temperature and the analysis result for the temperature that are paired with each other. The amount of correction for the installation position of each of the thermometers 400-1, 400-2 generated here is stored in the correction amount database 108.

Additionally, as in the case of FIG. 4 described above, the order of operation in steps S202, S203 in FIG. 7 may be any order.

Next, an example of a flow of operation in correcting the analysis result in the correction system 2 according to the second example embodiment will be described with reference to FIG. 8.

Figure 8:
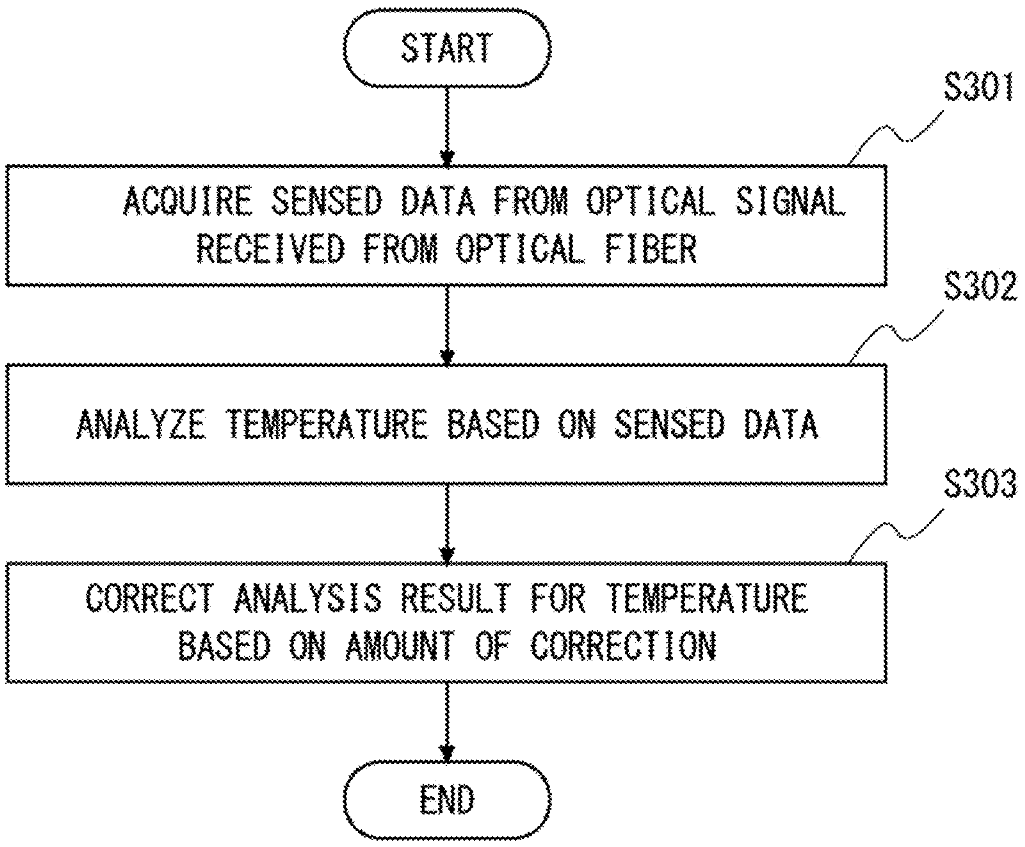
FIG. 8 is a flowchart showing an example of a flow of operation in correcting the analysis result in the correction system according to the second example embodiment.

As shown in FIG. 8, the optical fiber sensing apparatus 101 receives an optical signal from the optical fiber 200, and acquires sensed data from the optical signal that is received (step S301).

Next, the analysis apparatus 102 at least analyses the temperature at the installation position of the thermometer 400-1, 400-2 based on the sensed data acquired by the optical fiber sensing apparatus 101 (step S302).

Then, the correction apparatus 104 corrects the analysis result for the temperature at the installation position of the thermometer 400-1 based on the amount of correction for the installation position of the thermometer 400-1. Furthermore, the correction apparatus 104 corrects the analysis result for the temperature at the installation position of the thermometer 400-2 based on the amount of correction for the installation position of the thermometer 400-2 (step S303).

As described above, according to the second example embodiment, the correction amount generation apparatus 105 generates the amount of correction by which the analysis result for a temperature is corrected, based on the absolute value of the temperature and the analysis result for the temperature. Thereafter, the correction apparatus 104 corrects the analysis result for the temperature based on the amount of correction. Other aspects are the same as in the first example embodiment described above. Accordingly, as in the first example embodiment described above, the relative value that is the analysis result for the temperature based on optical fiber sensing can be corrected into an absolute value.

Third Example Embodiment

Figure 9:
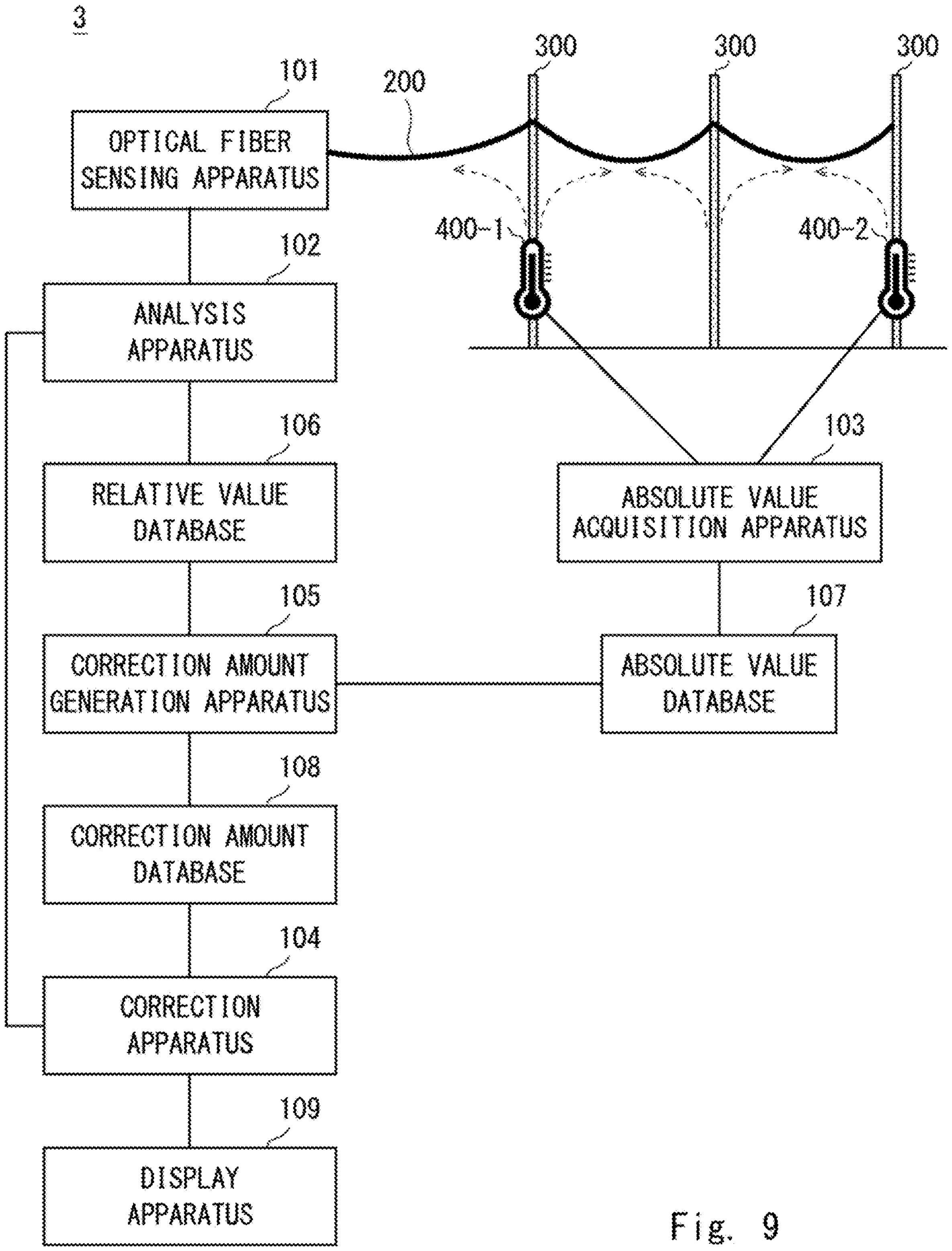
FIG. 9 is a diagram showing an example configuration of a correction system according to a third example embodiment.

First, a configuration of a correction system 3 according to a third example embodiment will be described with reference to FIG. 9. As shown in FIG. 9, the correction system 3 according to the third example embodiment is different from the correction system 2 according to the second example embodiment described above in that a display apparatus 109 is added.

Figures 10, 11:
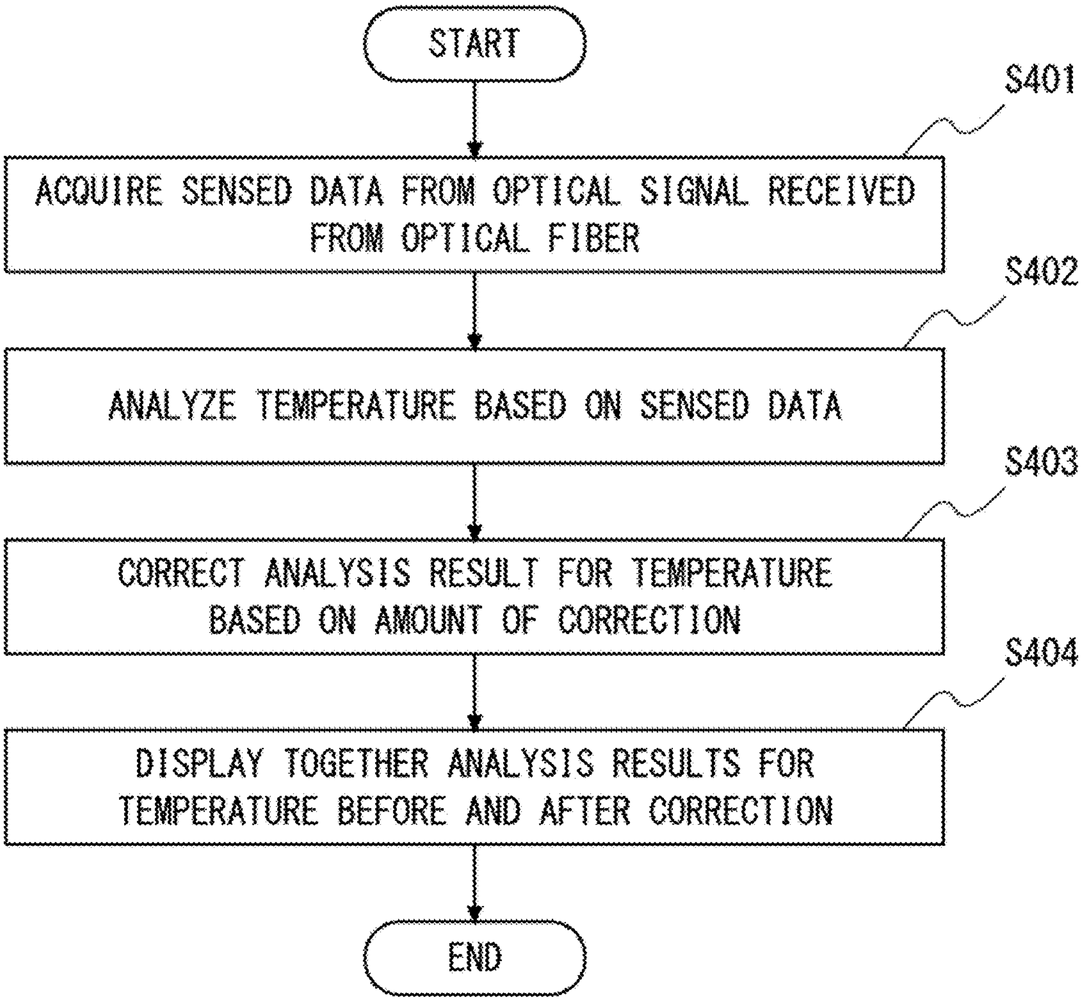
FIG. 10 is a diagram showing an example of a GUI screen that is displayed by a display apparatus according to the third example embodiment.
FIG. 11 is a flowchart showing an example of a flow of operation in correcting an analysis result in the correction system according to the third example embodiment.

The display apparatus 109 displays the analysis result for a temperature before correction by the correction apparatus 104 and the analysis result for the temperature after correction by the correction apparatus 104 in combination. For example, as shown in FIG. 10, the display apparatus 109 displays a graphical user interface (GUI) screen showing, in the form of a table, analysis results for a temperature before and after correction on a per-location basis. However, the GUI screen to be displayed by the display apparatus 109 is not limited to such a screen. For example, the display apparatus 109 may display a GUI screen where the analysis results for a temperature before and after correction are superimposed on a map. Furthermore, the display apparatus 109 may display a GUI screen showing only the analysis result for a temperature after correction.

Next, an example of a flow of operation in correcting an analysis result in the correction system 3 according to the third example embodiment will be described with reference to FIG. 11.

As shown in FIG. 11, first, steps S401 to S403 that are the same as steps S301 to S303 in FIG. 8 are performed. As a result, the analysis result for the temperature at the installation position of each of the thermometers 400-1, 400-2 is corrected by the correction apparatus 104.

Then, the display apparatus 109 displays the analysis result for the temperature before correction by the correction apparatus 104 and the analysis result for the temperature after correction by the correction apparatus 104 in combination (step S404). At this time, the display apparatus 109 may display the GUI screen as shown in FIG. 10, or may display a GUI screen where the analysis results for the temperature before and after correction are superimposed on a map. The display apparatus 109 may alternatively display a GUI screen that shows only the analysis result for the temperature after correction.

Additionally, the flow of operation in generating the amount of correction for an analysis result in the correction system 3 according to the third example embodiment is the same as the flow in FIG. 7 according to the second example embodiment described above, and a description thereof is not repeated.

As described above, according to the third example embodiment, the display apparatus 109 displays the analysis result for the temperature after correction by the correction apparatus 104. The analysis result of optical fiber sensing may thus be displayed as an absolute value, and a user may visualize the analysis result of optical fiber sensing as an absolute value. Other advantageous effects are the same as those in the first example embodiment described above.

Other Example Embodiments

In the first example embodiment described above, the optical fiber sensing apparatus 101, the analysis apparatus 102, the absolute value acquisition apparatus 103, and the correction apparatus 104 are separate apparatuses, but the apparatuses may instead be collectively provided in one apparatus.

Figure 12:
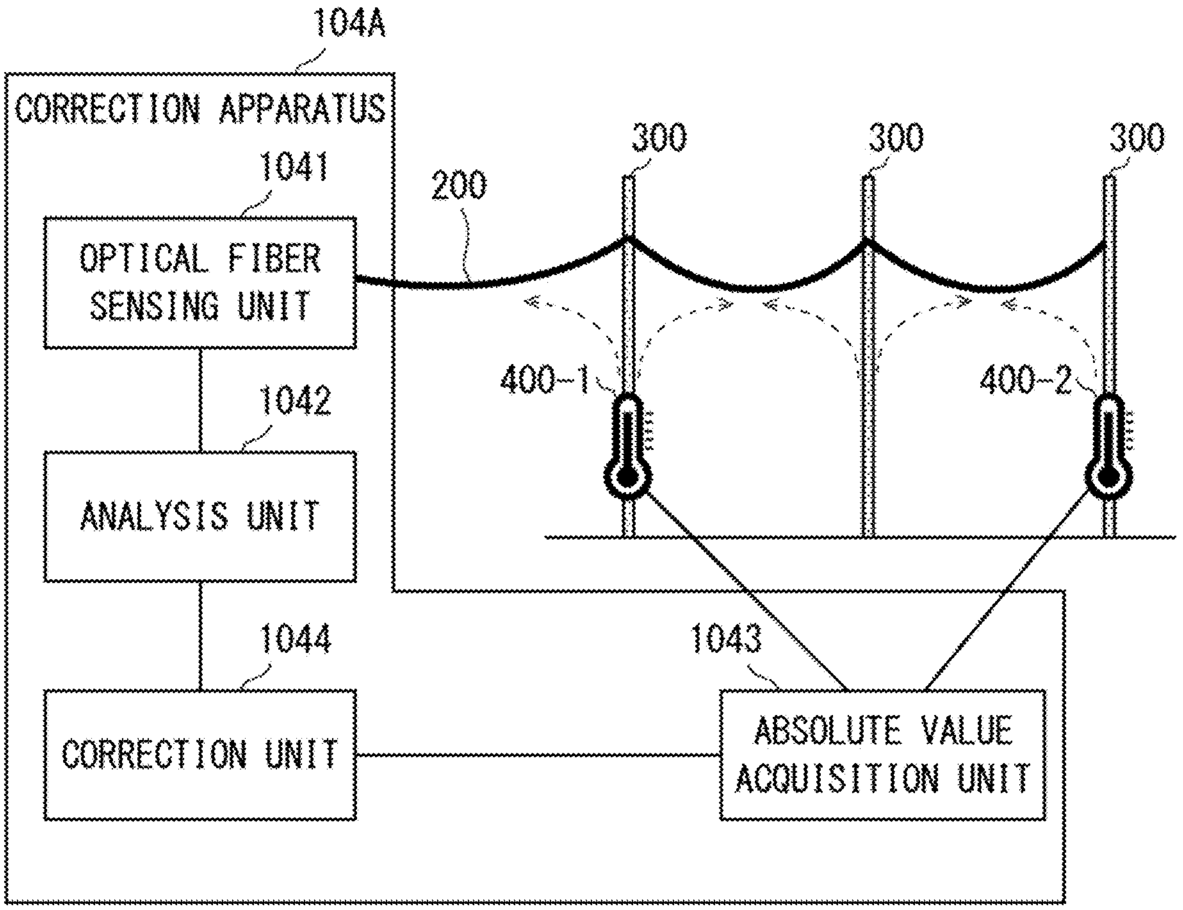
FIG. 12 is a diagram showing an example configuration of a correction apparatus according to another example embodiment.

FIG. 12 shows an example configuration of a correction apparatus 104A including structural elements corresponding to the optical fiber sensing apparatus 101, the analysis apparatus 102, the absolute value acquisition apparatus 103, and the correction apparatus 104 according to the first example embodiment described above.

The correction apparatus 104A shown in FIG. 12 includes an optical fiber sensing unit 1041, an analysis unit 1042, an absolute value acquisition unit 1043, and a correction unit 1044. The optical fiber sensing unit 1041 corresponds to the optical fiber sensing apparatus 101, the analysis unit 1042 corresponds to the analysis apparatus 102, the absolute value acquisition unit 1043 corresponds to the absolute value acquisition apparatus 103, and the correction unit 1044 corresponds to the correction apparatus 104.

Furthermore, the correction apparatus 104A shown in FIG. 12 may include elements corresponding to the correction amount generation apparatus 105, the relative value database 106, the absolute value database 107, and the correction amount database 108 according to the second example embodiment described above. Furthermore, the correction apparatus 104A shown in FIG. 12 may include an element corresponding to the display apparatus 109 according to the third example embodiment described above.

Furthermore, in the second and third example embodiments described above, the relative value database 106 for storing a relative value that is an analysis result for a temperature from the analysis apparatus 102 is provided, but such a case is not restrictive. For example, instead of the relative value database 106, a database for storing the sensed data before analysis by the analysis apparatus 102 may be provided.

Moreover, in the second and third example embodiments described above, a description is given assuming that the analysis apparatus 102 holds a table as shown in FIG. 2, and that the amount of correction for the installation position of the thermometer 400-1, 400-2 is generated by analyzing the temperature at the installation position of the thermometer 400-1, 400-2, but such a case is not restrictive.

For example, a vibration generator including a function of acquiring position information of a current position and a communication function may be prepared, and the amount of correction may be generated using the vibration generator. In the following, such a method will be described citing a case of generating the amount of correction for the installation position of the thermometer 400-1 as an example.

The vibration generator applies vibration of a specific vibration pattern to the utility pole 300 where the thermometer 400-1 is installed. Then, the vibration generator notifies the correction amount generation apparatus 105 of date/time of application of the vibration, the absolute value of the temperature of the thermometer 400-1 at that time, and the current position.

The correction amount generation apparatus 105 acquires, from the analysis apparatus 102, date/time when the optical fiber 200 detected the vibration of the specific vibration pattern applied to the utility pole 300 by the vibration generator and the position (the distance from the optical fiber sensing apparatus 101 to the optical fiber 200), and also acquires the analysis result for the temperature on the date/time and at the position.

Then, the correction amount generation apparatus 105 pairs the absolute value of the temperature sent from the vibration generator with the analysis result for the temperature acquired from the analysis apparatus 102, and generates the amount of correction. Thereafter, the amount of correction is used as the amount of correction for the installation position of the thermometer 400-1.

Furthermore, in the first to third example embodiments described above, the analysis target is described to be a temperature, but the analysis target is not limited to a temperature, and may be an amount of vibration, a sound volume or the like.

<Hardware Configuration of Correction Apparatus According to Example Embodiment>

Next, an example hardware configuration of a computer 500 for implementing the correction apparatus 104A according to the other example embodiment described above will be described with reference to FIG. 13.

Figure 13:
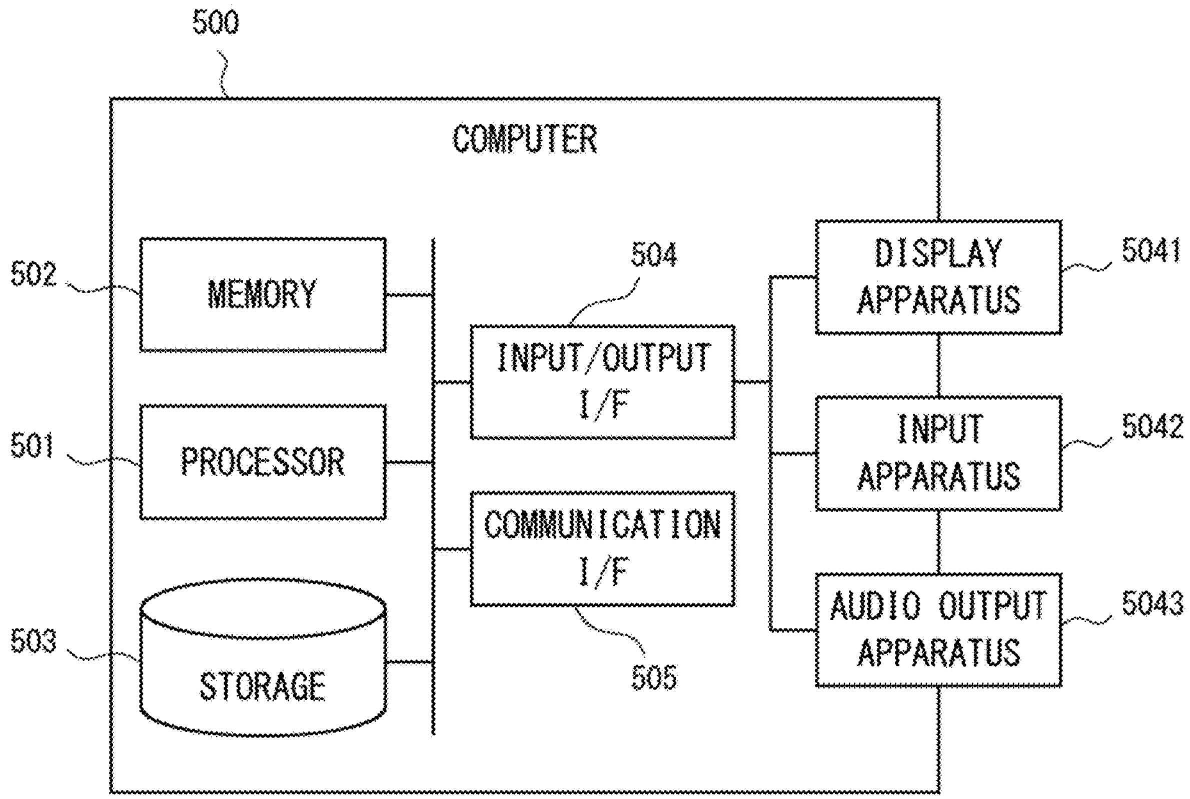
FIG. 13 is a block diagram showing an example hardware configuration of a computer for implementing the correction apparatus according to the other example embodiment.

As shown in FIG. 13, the computer 500 includes a processor 501, a memory 502, a storage 503, an input/output interface (an input/output I/F) 504, a communication interface (a communication I/F) 505, and the like. The processor 501, the memory 502, the storage 503, the input/output interface 504, and the communication interface 505 are interconnected by a data transmission channel used for transmission/reception of data.

The processor 501 is an arithmetic processing unit such as a central processing unit (CPU) or a graphics processing unit (GPU), for example. The memory 502 is a memory such as a random access memory (RAM) or a read only memory (ROM), for example. The storage 503 is a storage device such as a hard disk drive (HDD), a solid state drive (SSD), or a memory card, for example. The storage 503 may also be a memory such as a RAM, a ROM, or the like.

The storage 503 stores programs for implementing functions of the structural elements of the correction apparatus 104A. The processor 501 implements functions of the structural elements of the correction apparatus 104A by executing the programs. At the time of executing each program, the processor 501 may load the program into the memory 502 and execute the same, or may execute the program without loading the same into the memory 502. Furthermore, the memory 502 and the storage 503 also serve to store information and data held by the structural elements of the correction apparatus 104A.

Furthermore, the programs described above may be stored using various types of non-transitory computer-readable media, and be supplied to a computer (including the computer 500). The non-transitory computer-readable media include various types of tangible storage media. Examples of the non-transitory computer-readable media include a magnetic recording medium (such as a flexible disk, a magnetic tape, and a hard disk drive), a magneto-optical recording medium (such as a magneto-optical disk), a compact disc-ROM (CD-ROM), a CD-Recordable (CD-R), a CD-ReWritable (CD-R/W), a semiconductor memory (such as a mask ROM, a programmable ROM (PROM), an erasable PROM (EPROM), a flash ROM, a RAM. Moreover, the programs may be supplied to a computer by various types of transitory computer readable media. Examples of the transitory computer readable media include an electric signal, an optical signal, and an electromagnetic wave. The transitory computer readable medium can supply a program to a computer via a wired communication channel such as an electric wire or an optical fiber, or via a wireless communication channel.

The input/output interface 504 is connected to a display apparatus 5041, an input apparatus 5042, an audio output apparatus 5043, and the like. The display apparatus 5041 is an apparatus that displays a screen corresponding to drawing data processed by the processor 501, such as a liquid crystal display (LCD), a cathode ray tube (CRT) display, or a monitor. The input apparatus 5042 is an apparatus for receiving an operation input from an operator, and is a keyboard, a mouse, or a touch sensor, for example. The display apparatus 5041 and the input apparatus 5042 may be integrated and implemented as a touch panel. The audio output apparatus 5043 is an apparatus that outputs a sound corresponding to acoustic data processed by the processor 501, such as a speaker.

The communication interface 505 transmits/receives data from an external apparatus. For example, the communication interface 505 communicates with an external apparatus via a wired communication channel or a wireless communication channel.

Heretofore, the present disclosure has been described with reference to example embodiments, but the present disclosure is not limited to the example embodiments described above. Various changes that can be understood by those skilled in the art may be made within the scope of the present disclosure with respect to configurations and details of the present disclosure.

The example embodiments described above may be partly or entirely described by, but are not limited to, Supplementary notes below.

(Supplementary Note 1)

A correction system including:

an optical fiber sensing apparatus configured to receive an optical signal from an optical fiber, and acquire sensed data from the optical signal;

an analysis apparatus configured to analyze an analysis target based on the sensed data;

an absolute value acquisition apparatus configured to acquire an absolute value of the analysis target; and a correction apparatus configured to correct an analysis result for the analysis target from the analysis apparatus, based on the absolute value of the analysis target.

(Supplementary Note 2)

The correction system according to Supplementary note 1, further including a correction amount generation apparatus configured to generate an amount of correction for the analysis result for the analysis target, based on the analysis result for the analysis target and the absolute value of the analysis target, in which the correction apparatus corrects the analysis result for the analysis target based on the amount of correction.

(Supplementary Note 3)

The correction system according to Supplementary note 2, in which the analysis apparatus acquires first related information related to the analysis result for the analysis target, the absolute value acquisition apparatus acquires second related information related to the absolute value of the analysis target, and the correction amount generation apparatus pairs the analysis result for the analysis target and the absolute value of the analysis target with each other based on the first related information and the second related information, and generates the amount of correction for the analysis result for the analysis target based on the analysis result for the analysis target and the absolute value of the analysis target that are paired with each other.

(Supplementary Note 4)

The correction system according to Supplementary note 3, in which the first related information and the second related information include date/time information and position information, and the correction amount generation apparatus pairs the analysis result for the analysis target and the absolute value of the analysis target with substantially matching date/time information and position information.

(Supplementary Note 5)

The correction system according to Supplementary note 3 or 4, further including:

a first database configured to store the analysis result for the analysis target and the first related information;

a second database configured to store the absolute value of the analysis target and the second related information; and a third database configured to store the amount of correction for the analysis result for the analysis target.

(Supplementary Note 6)

The correction system according to any one of Supplementary notes 1 to 5, further including a display apparatus configured to display the analysis result for the analysis target after correction.

(Supplementary Note 7)

The correction system according to any one of Supplementary notes 1 to 6, in which the analysis target is a temperature, an amount of vibration, or a sound volume.

(Supplementary Note 8)

A correction apparatus including:

an optical fiber sensing unit configured to receive an optical signal from an optical fiber, and acquire sensed data from the optical signal;

an analysis unit configured to analyze an analysis target based on the sensed data;

an absolute value acquisition unit configured to acquire an absolute value of the analysis target; and a correction unit configured to correct an analysis result for the analysis target from the analysis unit, based on the absolute value of the analysis target.

(Supplementary Note 9)

The correction apparatus to Supplementary note 8, further including a correction amount generation unit configured to generate an amount of correction for the analysis result for the analysis target, based on the analysis result for the analysis target and the absolute value of the analysis target, in which the correction unit corrects the analysis result for the analysis target based on the amount of correction.

(Supplementary Note 10)

The correction apparatus according to Supplementary note 9, in which the analysis unit acquires first related information related to the analysis result for the analysis target, the absolute value acquisition unit acquires second related information related to the absolute value of the analysis target, and the correction amount generation unit pairs the analysis result for the analysis target and the absolute value of the analysis target with each other based on the first related information and the second related information, and generates the amount of correction for the analysis result for the analysis target based on the analysis result for the analysis target and the absolute value of the analysis target that are paired with each other.

(Supplementary Note 11)

The correction apparatus according to Supplementary note 10, in which the first related information and the second related information include date/time information and position information, and the correction amount generation unit pairs the analysis result for the analysis target and the absolute value of the analysis target with substantially matching date/time information and position information.

(Supplementary Note 12)

The correction apparatus according to Supplementary note 10 or 11, further including:

a first database configured to store the analysis result for the analysis target and the first related information;

a second database configured to store the absolute value of the analysis target and the second related information; and a third database configured to store the amount of correction for the analysis result for the analysis target.

(Supplementary Note 13)

The correction apparatus according to any one of Supplementary notes 8 to 12, further including a display unit configured to display the analysis result for the analysis target after correction.

(Supplementary Note 14)

The correction apparatus according to any one of Supplementary notes 8 to 13, in which the analysis target is a temperature, an amount of vibration, or a sound volume.

(Supplementary Note 15)

A correction method performed by a correction apparatus, the method including:

a step of receiving an optical signal from an optical fiber, and acquiring sensed data from the optical signal;

an analysis step of analyzing an analysis target based on the sensed data;

an absolute value acquisition step of acquiring an absolute value of the analysis target; and a correction step of correcting an analysis result for the analysis target by the analysis step, based on the absolute value of the analysis target.

(Supplementary Note 16)

The correction method according to Supplementary note 15, further including a correction amount generation step of generating an amount of correction for the analysis result for the analysis target, based on the analysis result for the analysis target and the absolute value of the analysis target, in which, in the correction step, the analysis result for the analysis target is corrected based on the amount of correction.

(Supplementary Note 17)

The correction method according to Supplementary note 16, in which in the analysis step, first related information related to the analysis result for the analysis target is acquired, in the absolute value acquisition step, second related information related to the absolute value of the analysis target is acquired, and in the correction amount generation step, the analysis result for the analysis target and the absolute value of the analysis target are paired with each other based on the first related information and the second related information, and the amount of correction for the analysis result for the analysis target is generated based on the analysis result for the analysis target and the absolute value of the analysis target that are paired with each other.

(Supplementary Note 18)

The correction method according to Supplementary note 17, in which the first related information and the second related information include date/time information and position information, and in the correction amount generation step, the analysis result for the analysis target and the absolute value of the analysis target with substantially matching date/time information and position information are paired with each other.

(Supplementary Note 19)

The correction method according to Supplementary note 17 or 18, further including:

a step of storing the analysis result for the analysis target and the first related information in a first database;

a step of storing the absolute value of the analysis target and the second related information in a second database; and a step of storing the amount of correction for the analysis result for the analysis target in a third database.

(Supplementary Note 20)

The correction method according to any one of Supplementary notes 15 to 19, further including a display step of displaying the analysis result for the analysis target after correction.

(Supplementary Note 21)

The correction method according to any one of Supplementary notes 15 to 20, in which the analysis target is a temperature, an amount of vibration, or a sound volume.

REFERENCE SIGNS LIST

1, 2, 3 CORRECTION SYSTEM
101 OPTICAL FIBER SENSING APPARATUS
102 ANALYSIS APPARATUS
103 ABSOLUTE VALUE ACQUISITION APPARATUS
104, 104A CORRECTION APPARATUS
1041 OPTICAL FIBER SENSING UNIT
1042 ANALYSIS UNIT
1043 ABSOLUTE VALUE ACQUISITION UNIT
1044 CORRECTION UNIT
105 CORRECTION AMOUNT GENERATION APPARATUS
106 RELATIVE VALUE DATABASE
107 ABSOLUTE VALUE DATABASE
108 CORRECTION AMOUNT DATABASE
109 DISPLAY APPARATUS
200 OPTICAL FIBER
300 UTILITY POLE
400-1, 400-2 THERMOMETER
500 COMPUTER
501 PROCESSOR
502 MEMORY
503 STORAGE
504 INPUT/OUTPUT INTERFACE
5041 DISPLAY APPARATUS
5042 INPUT APPARATUS
5043 AUDIO OUTPUT APPARATUS
505 COMMUNICATION INTERFACE

What is claimed is:

1. A correction system comprising:
an optical fiber sensor apparatus configured to:
receive an optical signal from an optical fiber, and acquire sensed data from the optical signal,
acquire first related information related to an analysis result for an analysis target;
an analysis apparatus configured to analyze the analysis target based on the sensed data;
an absolute value acquisition apparatus configured to:
acquire an absolute value of the analysis target, and
acquire second related information related to the absolute value of the analysis target;
a correction apparatus configured to correct the analysis result for the analysis target from the analysis apparatus, based on the absolute value of the analysis target; and
a correction amount generation apparatus configured to:
generate an amount of correction for the analysis result for the analysis target, based on the analysis result for the analysis target and the absolute value of the analysis target, wherein the correction apparatus corrects the analysis result for the analysis target based on the amount of correction,
pair the analysis result for the analysis target and the absolute value of the analysis target with each other based on the first related information and the second related information, and
generate the amount of correction for the analysis result for the analysis target based on the analysis result for the analysis target and the absolute value of the analysis target that are paired with each other, and
wherein the first related information and the second related information include date/time information and position information, and
wherein the correction amount generation apparatus pairs the analysis result for the analysis target and the absolute value of the analysis target with substantially matching the date/time information and the position information.

2. The correction system according claim 1, further comprising:
a first database configured to store the analysis result for the analysis target and the first related information;
a second database configured to store the absolute value of the analysis target and the second related information; and
a third database configured to store the amount of correction for the analysis result for the analysis target.

3. The correction system according to claim 1, further comprising a display apparatus configured to display the analysis result for the analysis target after correction.

4. The correction system according to claim 1, wherein the analysis target is a temperature, an amount of vibration, or a sound volume.

5. A correction apparatus comprising:
at least one memory storing instructions; and
at least one processor configured to execute the instructions to:
receive an optical signal from an optical fiber, and acquire sensed data from the optical signal;
acquire first related information related to an analysis result for an analysis target;
analyze the analysis target based on the sensed data;
acquire an absolute value of the analysis target;
acquire second related information related to the absolute value of the analysis target;
correct an analysis result for the analysis target, based on the absolute value of the analysis target;
generate an amount of correction for the analysis result for the analysis target, based on the analysis result for the analysis target and the absolute value of the analysis target, wherein the analysis result for the analysis target is corrected based on the amount of correction;
pair the analysis result for the analysis target and the absolute value of the analysis target with each other based on the first related information and the second related information; and
generate the amount of correction for the analysis result for the analysis target based on the analysis result for the analysis target and the absolute value of the analysis target that are paired with each other,
wherein the first related information and the second related information comprise date/time information and position information, and
wherein the analysis result for the analysis target and the absolute value of the analysis target are paired with substantially matching the date/time information and the position information.

6. The correction apparatus according to claim 5, further comprising:
a first database configured to store the analysis result for the analysis target and the first related information;
a second database configured to store the absolute value of the analysis target and the second related information; and
a third database configured to store the amount of correction for the analysis result for the analysis target.

7. The correction apparatus according to claim 5, further comprising a display unit configured to display the analysis result for the analysis target after correction.

8. The correction apparatus according to claim 5, wherein the analysis target is a temperature, an amount of vibration, or a sound volume.

9. A correction method performed by a correction apparatus, the method comprising:

receiving an optical signal from an optical fiber, and acquiring sensed data from the optical signal;

acquiring first related information related to an analysis result for an analysis target;

analyzing an analysis target based on the sensed data;

acquiring an absolute value of the analysis target;

acquiring second related information related to the absolute value of the analysis target;

correcting an analysis result for the analysis target by the analysis step, based on the absolute value of the analysis target;

generating an amount of correction for the analysis result for the analysis target, based on the analysis result for the analysis target and the absolute value of the analysis target, wherein the analysis result for the analysis target is corrected based on the amount of correction;

pairing the analysis result for the analysis target and the absolute value of the analysis target with each other based on the first related information and the second related information; and generating the amount of correction for the analysis result for the analysis target based on the analysis result for the analysis target and the absolute value of the analysis target that are paired with each other, and wherein the first related information and the second related information include date/time information and position information, and wherein the analysis result for the analysis target and the absolute value of the analysis target are paired with substantially matching the date/time information and the position information.

10. The correction method according claim 9, further comprising:

storing the analysis result for the analysis target and the first related information in a first database;

storing the absolute value of the analysis target and the second related information in a second database; and storing the amount of correction for the analysis result for the analysis target in a third database.

11. The correction method according to claim 9, further comprising displaying the analysis result for the analysis target after correction.

12. The correction method according to claim 9, wherein the analysis target is a temperature, an amount of vibration, or a sound volume.

* * * * *